(12) United States Patent
Braswell

(10) Patent No.: US 9,234,496 B2
(45) Date of Patent: Jan. 12, 2016

(54) PORTABLE SWIM CURRENT GENERATOR

(76) Inventor: Keith Braswell, Moravian Falls, NC (US)

( * ) Notice: Subject to any disclaimer, the term of this patent is extended or adjusted under 35 U.S.C. 154(b) by 833 days.

(21) Appl. No.: 13/565,462

(22) Filed: Aug. 2, 2012

(65) Prior Publication Data

US 2013/0034430 A1 Feb. 7, 2013

Related U.S. Application Data

(60) Provisional application No. 61/514,666, filed on Aug. 3, 2011.

(51) Int. Cl.
*A63B 69/12* (2006.01)
*F03B 17/06* (2006.01)
*E04H 4/00* (2006.01)
*E04H 4/12* (2006.01)

(52) U.S. Cl.
CPC ............ *F03B 17/061* (2013.01); *A63B 69/125* (2013.01); *A63B 2210/50* (2013.01); *A63B 2210/58* (2013.01); *E04H 4/0006* (2013.01); *E04H 4/12* (2013.01); *F05B 2240/9152* (2013.01); *F05B 2260/02* (2013.01); *Y02E 10/28* (2013.01)

(58) Field of Classification Search
CPC ............ A63B 69/125; A63B 2210/50; A63B 2210/58; E04H 4/0006; E04H 4/12; F04D 29/606; F04D 59/607; F04D 29/648
USPC ........ 4/492, 541.3, 541.6, 904; 415/126, 129, 415/131, 213.1; 416/246; 417/423.15, 361, 417/234, 61, 423.3; 482/55, 56
See application file for complete search history.

(56) References Cited

U.S. PATENT DOCUMENTS

| | | | | |
|---|---|---|---|---|
| 3,189,334 A | * | 6/1965 | Bell | A01K 63/042 417/61 |
| 3,515,495 A | * | 6/1970 | Blum | A43D 35/00 415/126 |
| 4,247,261 A | * | 1/1981 | Springston | E02B 15/02 417/14 |
| 5,662,558 A | | 9/1997 | Shannon, III | |
| 7,526,820 B2 | | 5/2009 | Murdock et al. | |
| 2007/0039092 A1 | * | 2/2007 | Murdock | A63B 69/125 4/496 |

FOREIGN PATENT DOCUMENTS

| | | |
|---|---|---|
| EP | 1878477 | 1/2008 |
| FR | 2554857 | 5/1985 |
| FR | 2589954 | 5/1987 |
| FR | 2682981 | 4/1993 |

OTHER PUBLICATIONS

Gordeeva, O., International Search Report, Oct. 17, 2012, Moscow, Russia.

* cited by examiner

*Primary Examiner* — Christopher Verdier
(74) *Attorney, Agent, or Firm* — Trego, Hines & Ladenheim, PLLC

(57) ABSTRACT

A swim current generator apparatus includes an enclosure and a motor shroud, the motor shroud enclosing a motor coupled to a propeller and having openings therein to permit the intake and discharge of water by the propeller, wherein the motor shroud is moveable between a retracted position within the enclosure and an extended position outside the enclosure.

19 Claims, 17 Drawing Sheets

PORTABLE SWIM CURRENT GENERATOR

CROSS-REFERENCE TO RELATED APPLICATIONS

This application claims the benefit of Provisional Patent Application No. 61/514,666, filed Aug. 3, 2011.

BACKGROUND OF THE INVENTION

The present invention relates generally to water exercise equipment, and more particularly to portable swim current generating devices.

Conventional distance swimming environments such as Olympic pools, lakes and oceans are not convenient to many swimmers. One alternative is a swim current generator that produces a moving flow of water so that one could swim in a stationary position. Often termed "swim spas", these are costly and require a permanent or semi-permanent installation with continuous maintenance. Further, these devices cannot be easily moved or stored without disassembly. Further, more portable devices that can be installed in an existing pool have a very "commercial" appearance, therefore needing to be stored out of sight when not in use.

Accordingly, there is a need for a portable swim current generator.

BRIEF SUMMARY OF THE INVENTION

This need is addressed by the present invention, which provides a portable swim current generator for existing pools that, when stored, resembles a decorative patio storage container.

According to one aspect of the invention, a water propulsion apparatus for a swim current generator, includes: a lift frame; a belt having first and second ends, the belt being configured to transmit both tension and compression forces and being capable of bending in one plane, wherein the belt is slidably mounted in the lift frame so as to be moveable between extended and retracted positions; a motor shroud coupled to one end of the belt, the motor shroud enclosing a motor coupled to a propeller, the motor shroud having openings therein to permit the intake and discharge of water by the propeller; and an actuator coupled to the lift frame and the belt, wherein the actuator is configured to move the belt between the extended and retracted positions.

According to another aspect of the invention, a swim current generator apparatus includes: an enclosure; and a motor shroud, the motor shroud enclosing a motor coupled to a propeller, and having openings therein to permit the intake and discharge of water by the propeller, wherein the motor shroud is moveable between a retracted position within the enclosure and an extended position outside the enclosure.

According to another aspect of the invention, a swim current generator apparatus includes: an enclosure; a lift frame disposed inside the enclosure; a belt having first and second ends, the belt being configured to transmit both tension and compression forces and being capable of bending in one plane, wherein the belt is slidably mounted in the frame so as to be moveable between extended and retracted positions; a motor shroud coupled to the one end of the belt, the motor shroud enclosing a motor coupled to a propeller, the motor shroud configured to bear against a wall of a swimming pool and having openings therein to permit the intake and discharge of water by the propeller; and an actuator coupled to the frame and the belt, wherein the actuator is configured to move the belt between the extended and retracted positions.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
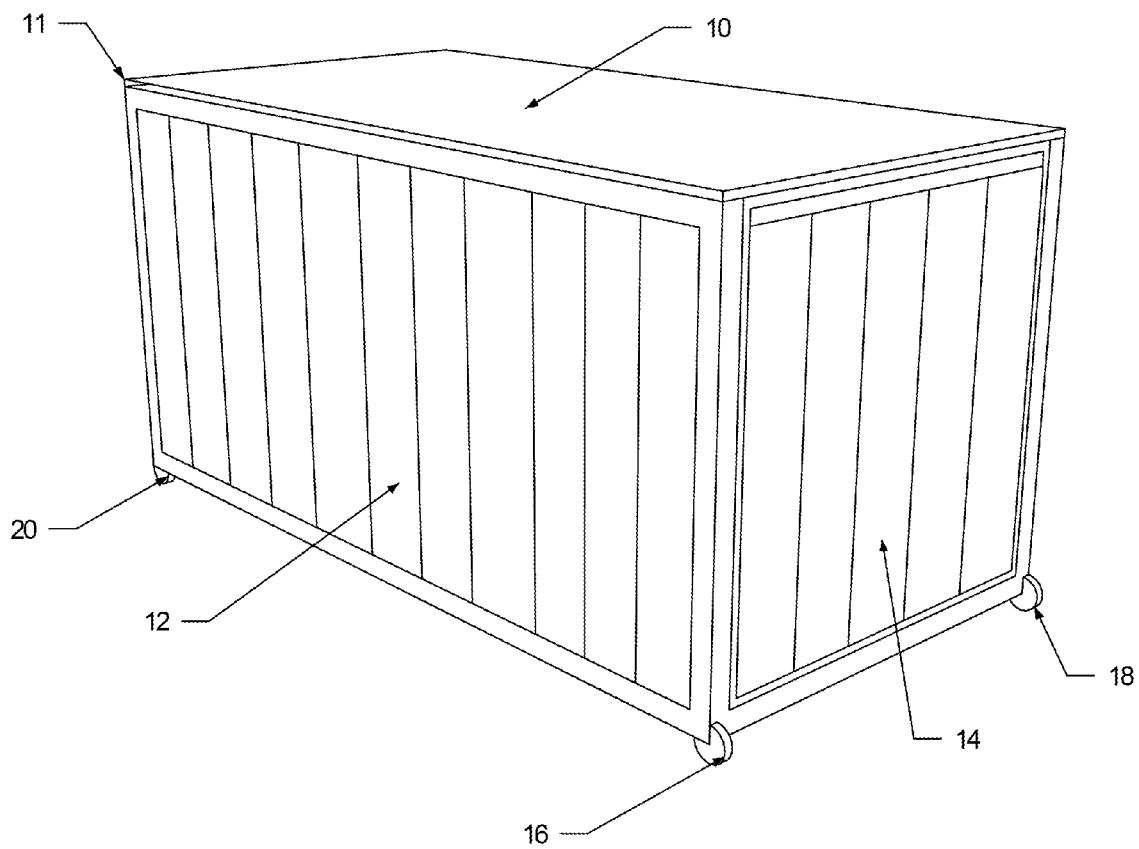
FIG. 1 is a perspective view of a portable swim current generator constructed according to one aspect of the present invention, in the stored position.

Referring to the drawings wherein identical reference numerals denote the same elements throughout the various views, in FIG. 1 there is shown a perspective view of a decorative portable swim current generator enclosure 11 showing a hinged access lid 10, decorative side 12, decoratively matching motor shroud bottom 14, roller 16, roller 18, and swivel caster 20.

In further detail, still referring to FIG. 1, the hinged access lid 10 is sufficiently wide and long enough to fully cover the enclosure 11. The enclosure 11 dimensions are sufficient to house all componentry. For example its approximate dimensions may be 91 to 120 cm (36 in. to 48 in.) long, 45 to 60 cm (18 in. to 24 in.) wide, and 45 to 60 cm (18 in. to 24 in.) tall. The enclosure 11 includes roller 16 and roller 18 located on the bottom of enclosure 11 near the corners adjacent to the motor shroud bottom 14. Also the enclosure 11 may have swivel caster 20 located opposite end of roller 16.

Figure 2:
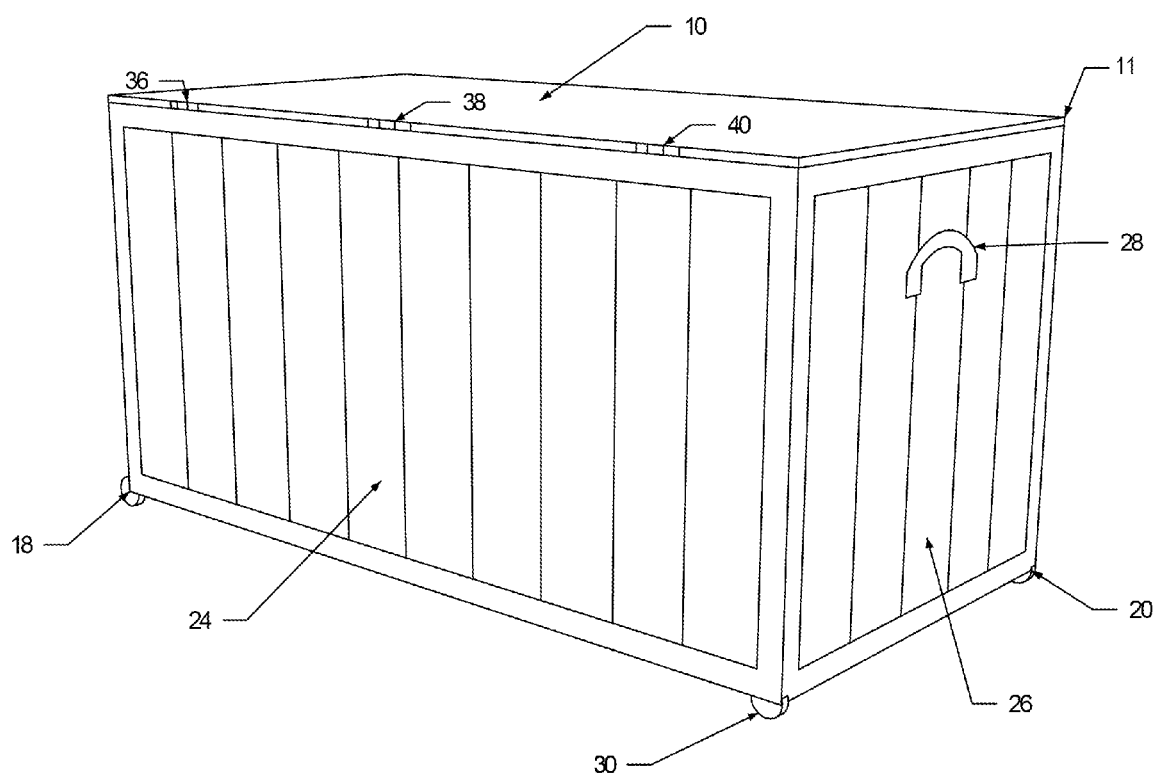
FIG. 2 is another perspective view of a decorative portable swim current generator in the stored position as referenced in FIG. 1.

Referring now to FIG. 2, there is shown another perspective view of the decorative portable swim current generator enclosure 11 showing a hinged access lid 10, hinge 36, hinge 38, hinge 40, handle 28, decorative end 26, roller 18, swivel caster 30, and swivel caster 20.

In further detail, still referring to the invention in FIG. 2, the enclosure 11 has a handle 28 located on decorative end 26, and may have swivel casters 30 and 20 also attached to bottom of enclosure 11 on decorative end 26. Shown also is roller 18 located opposite decorative end 26 on lower corner.

The decorative enclosure 11 may be made of wood, plastic, fiberglass, metal or any other sufficiently rigid and strong materials. Further, the various components of the decorative enclosure 11 can be made of different materials.

Figure 3:
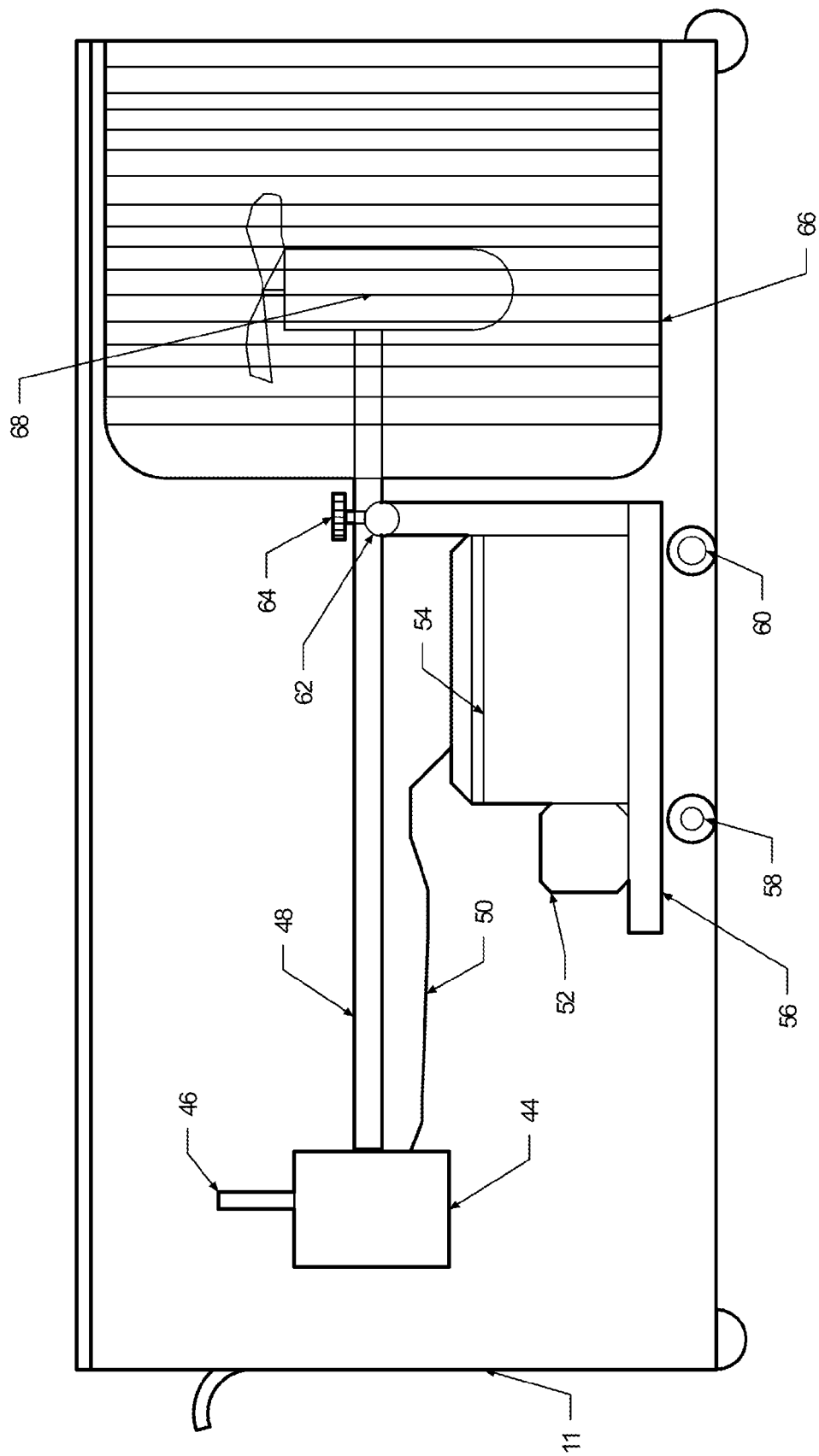
FIG. 3 is a cut-away side view of the swim current generator with its componentry in a "stored" position.

Referring now to FIG. 3, there is shown a view of the decorative enclosure 11 with componentry arranged in the stored position including speed control head 44, speed selector handle 46, support shaft 48, battery cable 50, three stage battery charger 52, battery enclosure 54, sliding carriage 56, carriage roller 58, carriage roller 60, hinge point 62, height adjustment knob 64, motor shroud 66, and motor/propeller assembly 68. Collectively, the sliding carriage 56 and the attached pivotable support shaft 48 constitutes a lift apparatus for the motor shroud 66. Collectively, the lift apparatus, the motor/propeller assembly 68, and the motor shroud 66 define a water propulsion apparatus.

In FIG. 3, the componentry is shown in a compact stored position in its decorative enclosure 11 that can be easily moved about. Each component is explained further with reference to FIG. 4.

Figure 4:
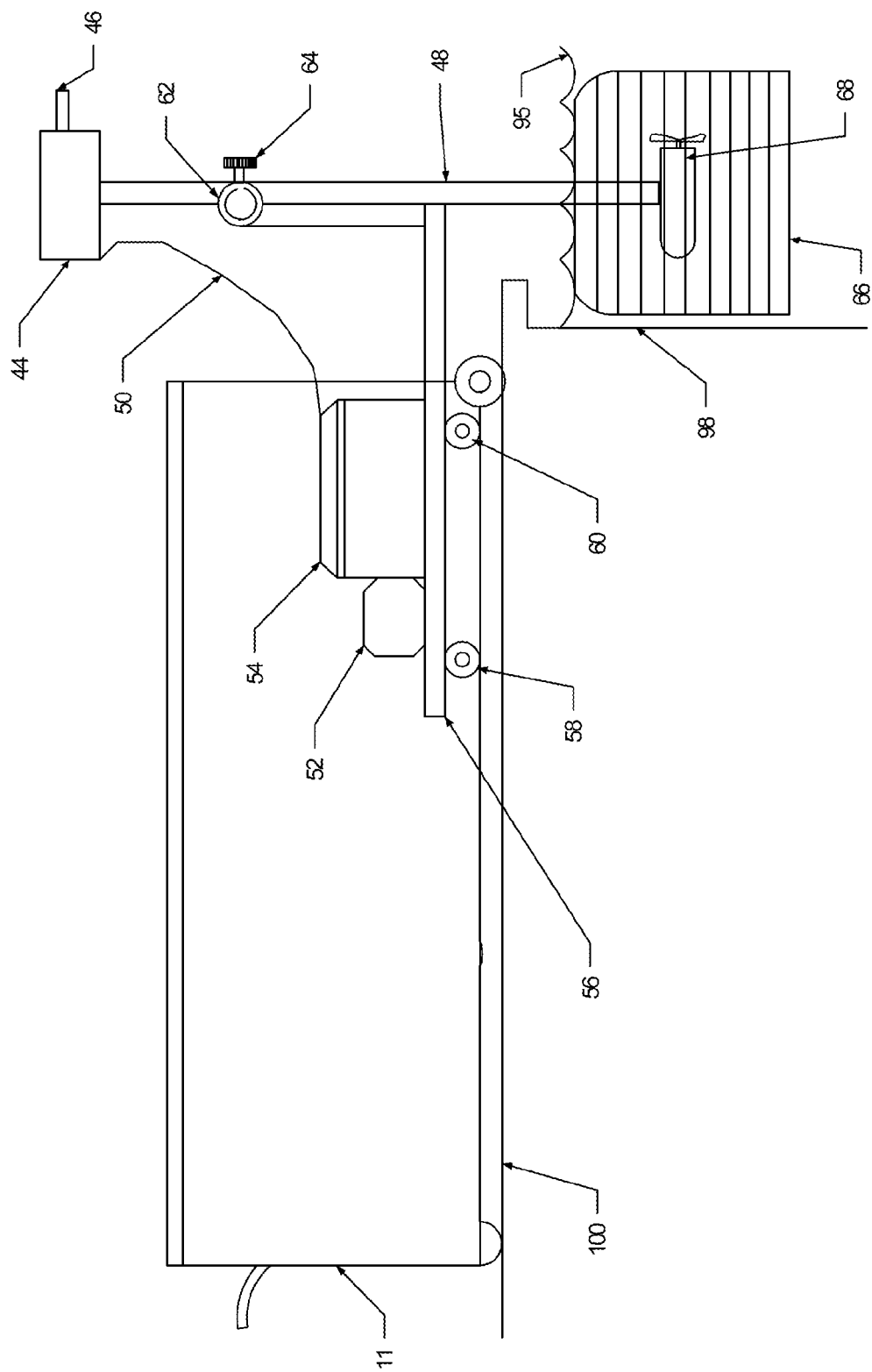
FIG. 4 is a cut-away side view of the swim current generator with its componentry in an "in use" position.

In FIG. 4, the decorative portable swim current generator is shown with the componentry in the "in use" position. In further detail, the enclosure 11 is shown resting on a pool deck 100 within about 15 cm (6 in.) of the pool wall 98 in preparation for use. In further detail, the sliding carriage 56 has been moved towards the open end of the decorative enclosure 11 using carriage rollers 58 and 60, thus, allowing the motor support shaft 48 to be rotated 90 degrees at hinge point 62 from the horizontal "stored" position to a vertical, "in use" position. Further, it is shown that the height adjustment 64 is used to lower the motor assembly including the speed control head 44, speed adjustment handle 46, the motor support shaft 48, the motor shroud 66, and the motor/propeller assembly 68 so as to position the top of the motor shroud 66 at the pool water surface level 95. In further detail, the deep cycle 12 volt battery that is contained in the battery enclosure 54 and charged using the three stage battery charger 52 when not in use is connected to the speed control head 44 by the battery cable 50 sending power through the motor support shaft 48 to the motor/propeller assembly 68. At this stage, the user can initiate and control a flow of water away from the pool wall 98 using the speed control handle 46, thus producing a water current in which the user can swim without lateral movement. This allows for simulated, continuous, distance swimming in an otherwise limited body of water. Upon termination of use, the process is reversed and all componentry is returned to its "stored" position as shown in FIG. 3. The bottom of the motor shroud 66, when locked into the stored position, completes a congruent, decorative, exterior appearance of the enclosure 11.

Figure 5:
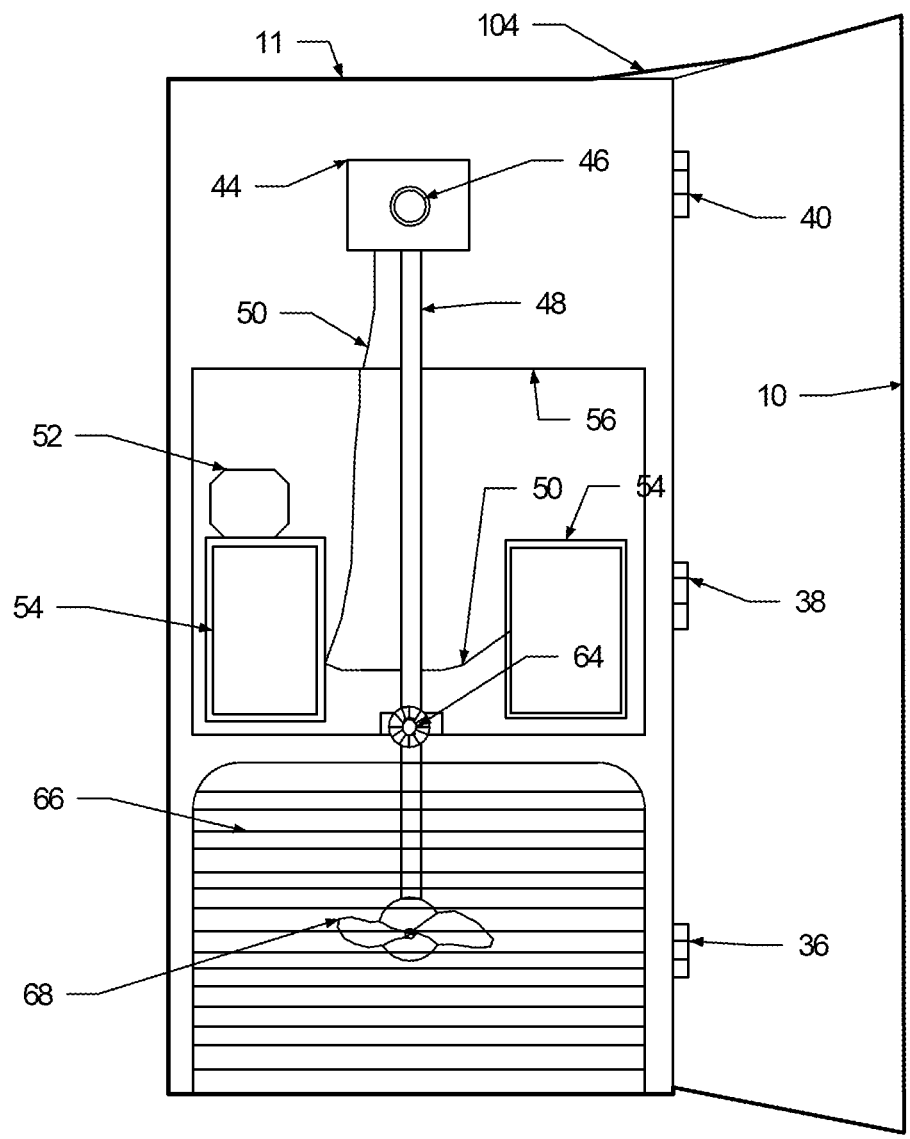
FIG. 5 is a top plan view of the swim current generator with its componentry in the "stored" position with an access lid open.

FIG. 5 is a top view of the decorative portable swim current generator in the "stored" position in its decorative enclosure 11 with the access lid 10 open and supported by the lid support strap 104 and hinges 36, 38, and 40. Further, the componentry arrangement is displayed including the speed control head 44, the speed control handle 46, the support shaft 48, the battery cables 50, the sliding carriage 56, the three stage battery charger 52, battery enclosures 54, height adjustment knob 64, motor/propeller assembly 68, and motor shroud 66 shown completing the fourth side of the rectangular decorative enclosure 11.

Figure 6:
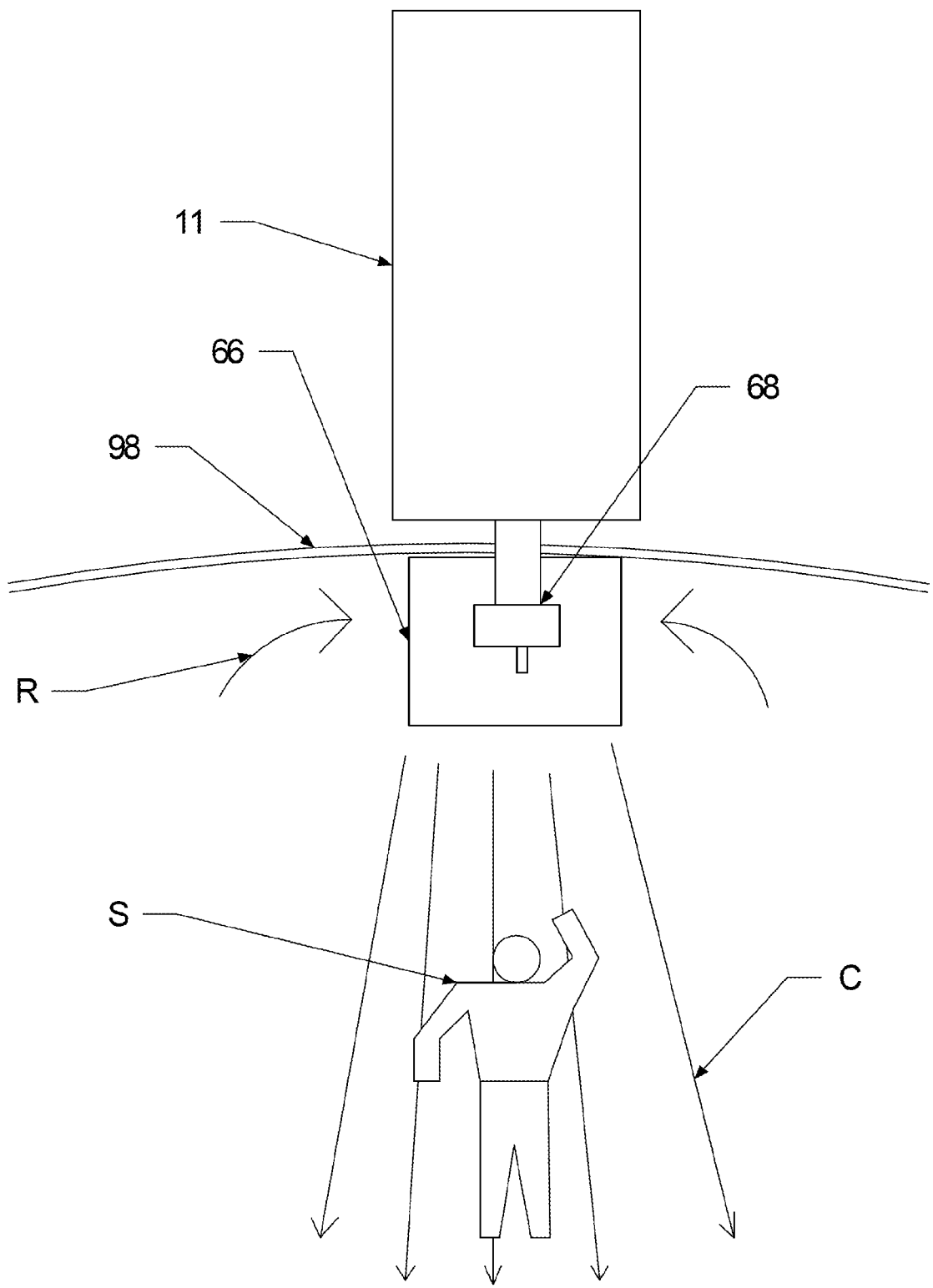
FIG. 6 is a top plan view of the swim current generator and a swimmer while "in use"
Figure 7:
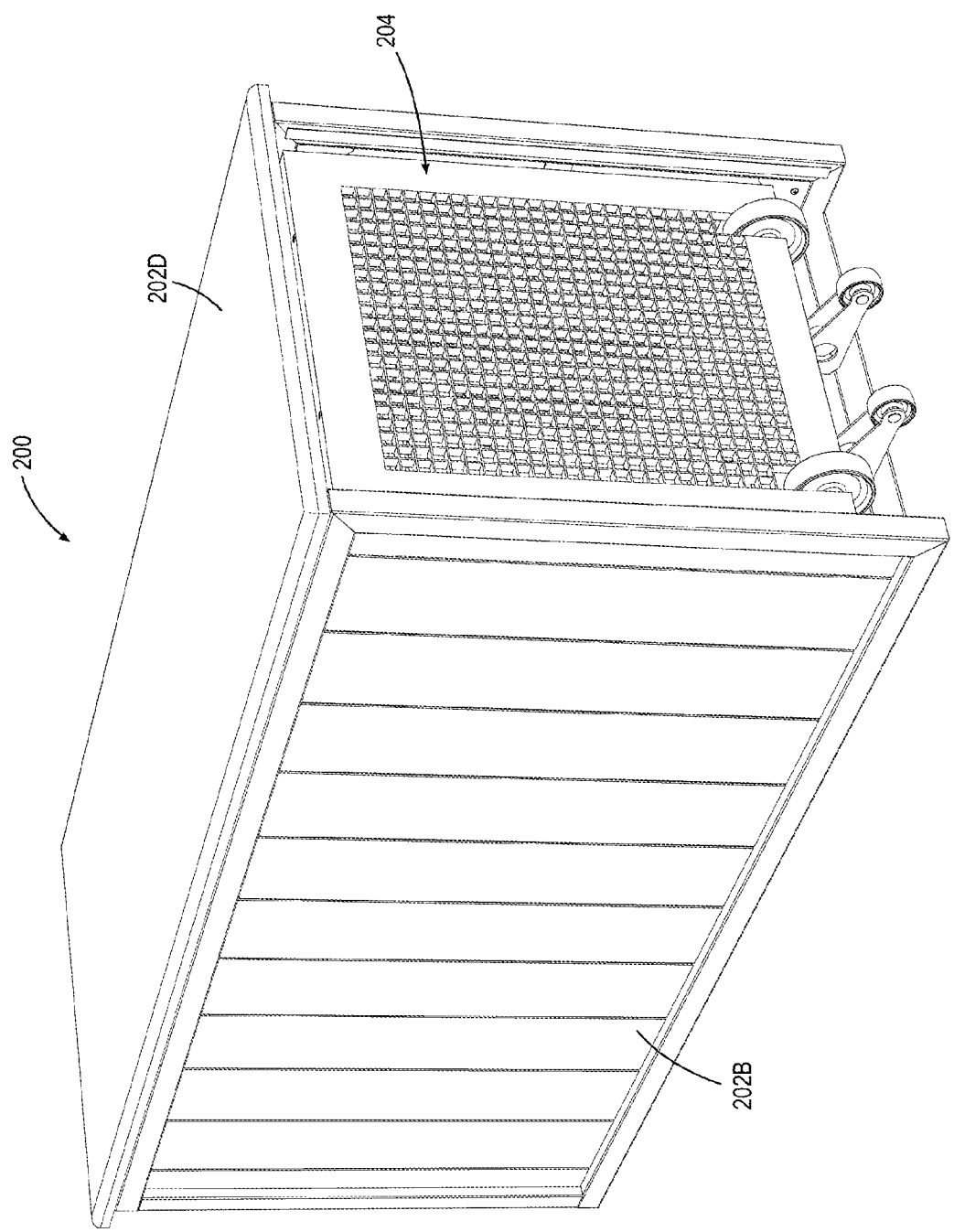
FIG. 7 is a front perspective view of an alternative swim current generator constructed in accordance with an aspect of the present invention.
Figure 8:
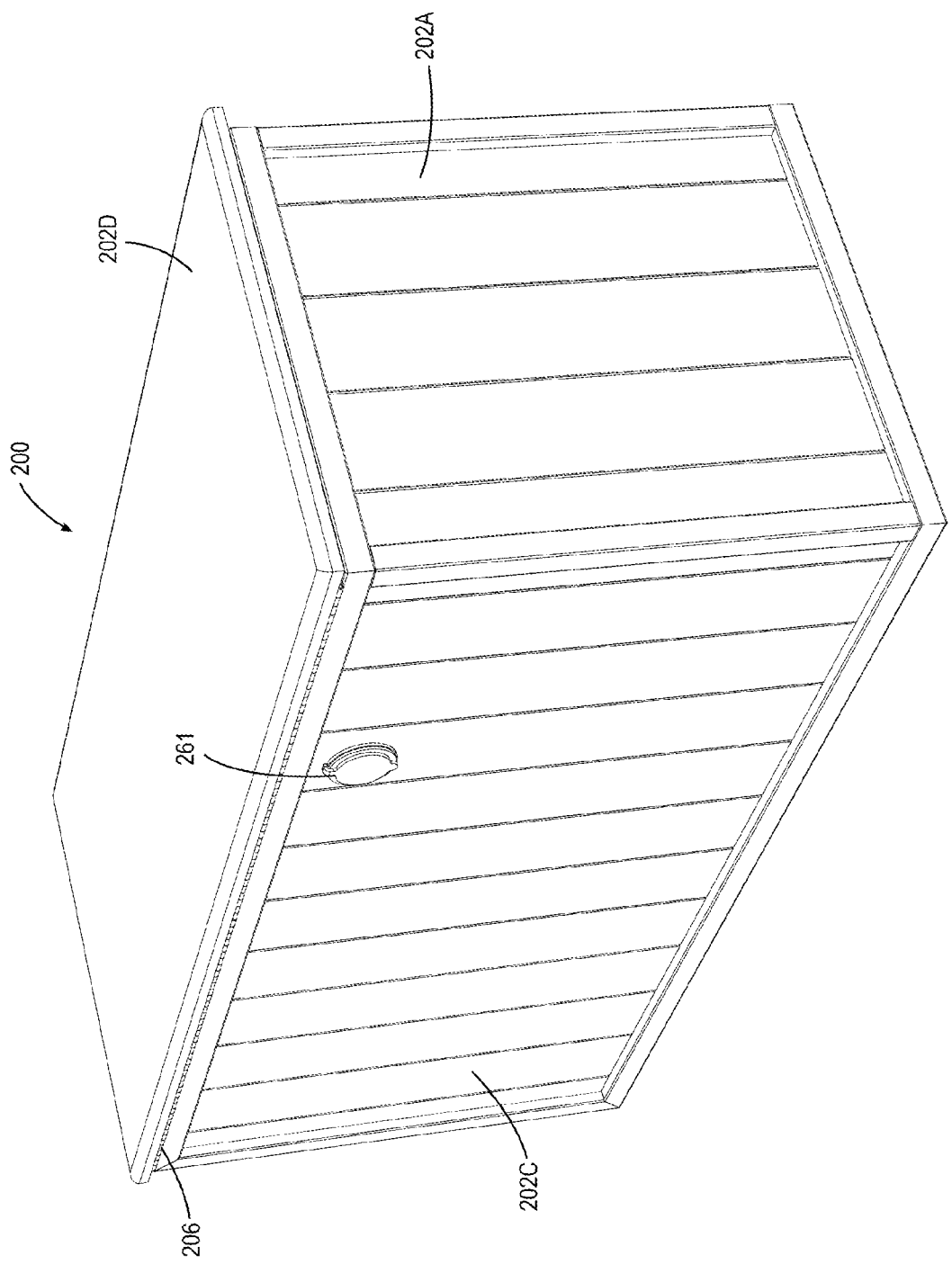
FIG. 8 is a rear perspective view of the swim current generator of FIG. 7.
Figure 9:
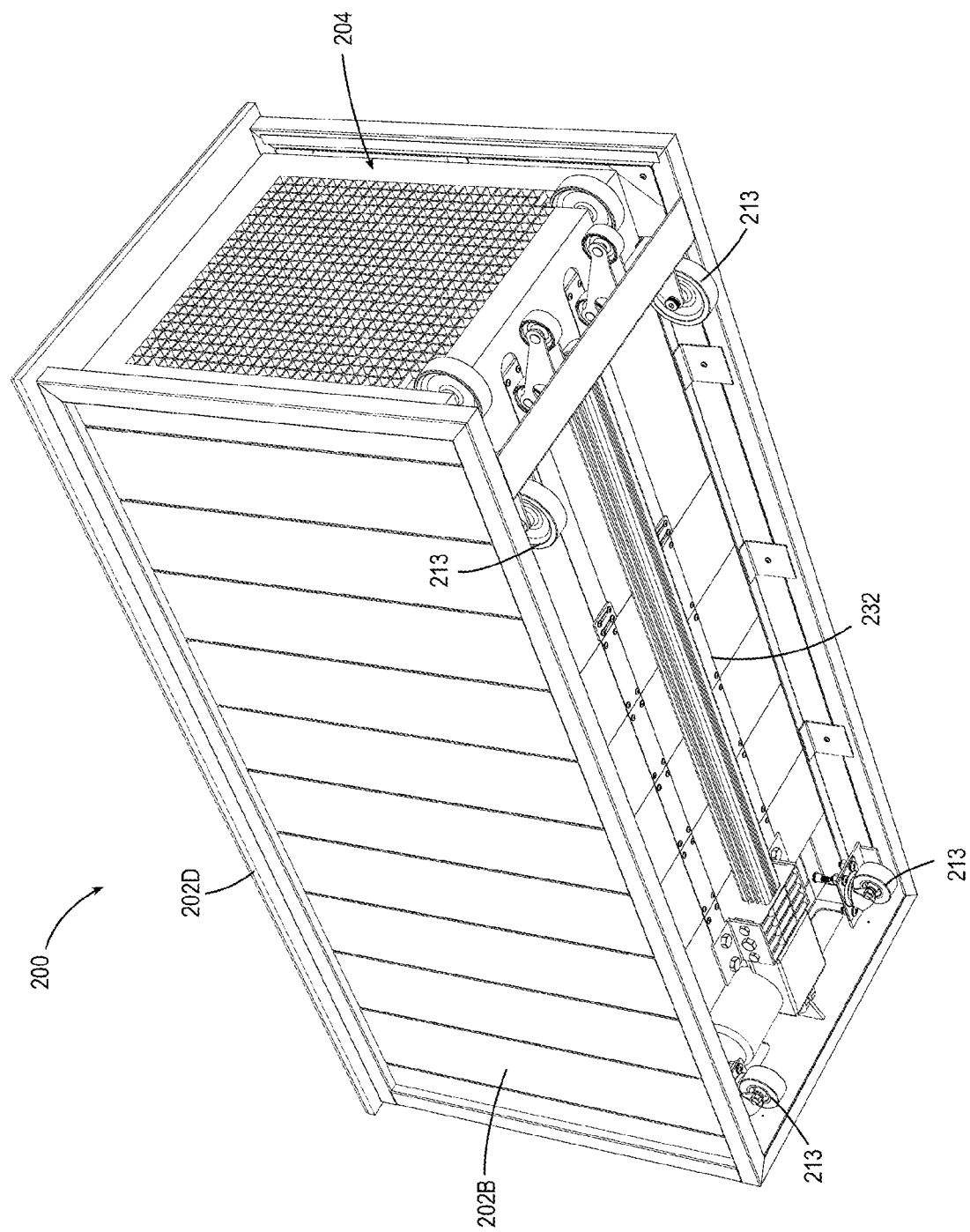
FIG. 9 is a bottom perspective view of the swim current generator of FIG. 7.

In FIG. 6, the decorative, portable, swim current generator is shown from a top view while in use. In more detail, the portable swim current generator is shown with the decorative enclosure 11 located adjacent to the pool edge 98 with motor assembly 68 and motor shroud 66 in the "in use" position. Further, a swimmer "S" is shown in the swim current "C" with the direction of flow of the swim current indicated as outward from the pool wall 98. In further detail, the direction of the inflow or return flow "R" is shown entering the sides of the motor shroud 66. Because the thrust forces generated by the motor/propeller assembly 68 act against the pool wall 98, the swim current generator does not need to be anchored to the pool deck 100 or pool wall 98.

FIGS. 7-17 illustrate an alternative portable swim current generator 200 constructed according to another aspect of the present invention. The exterior components of swim current generator 200 include several panels 202A-202D, including a rear panel 202A, opposed side panels 202B and 202C, and a top panel (or lid) 202D.

The panels 202A-202D may be constructed from any rigid material, such as wood, plastic, composites, or metal. Preferably they are made from a material that is water and moisture resistant, for example polyvinylchloride (PVC).

The panels 202A-202D are arranged in a generally rectangular shape. The forward end of the swim current generator 200 is open, exposing a motor shroud 204 in a retracted or stowed position.

The top panel 202D is mounted by a hinge 206 and is pivotable between a horizontal closed position (shown in FIG. 7) and an open position which exposes internal components of the swim current generator 200, described in more detail below.

Figure 10:
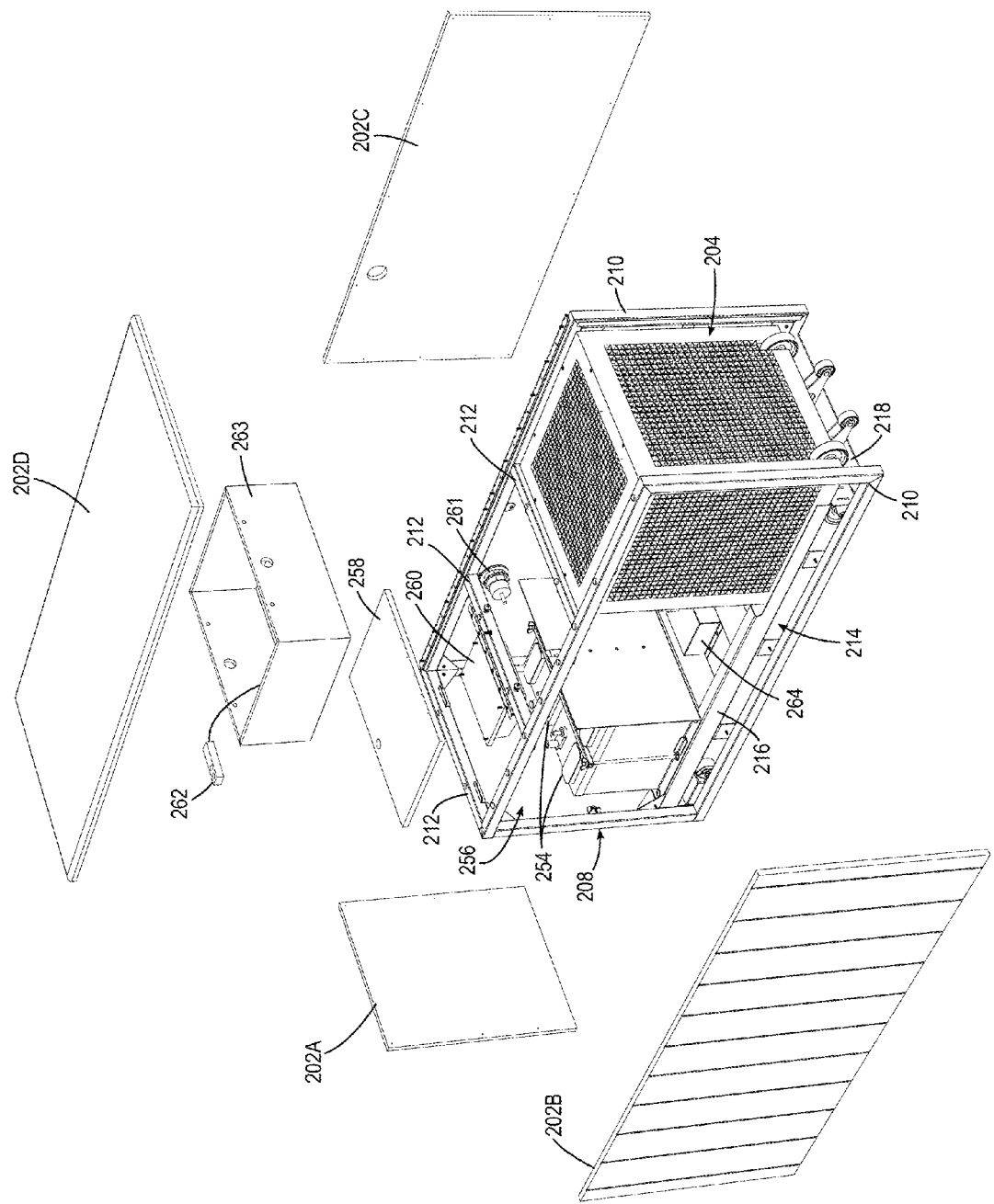
FIG. 10 is an exploded perspective view of the swim current generator of FIG. 7.
Figure 11:
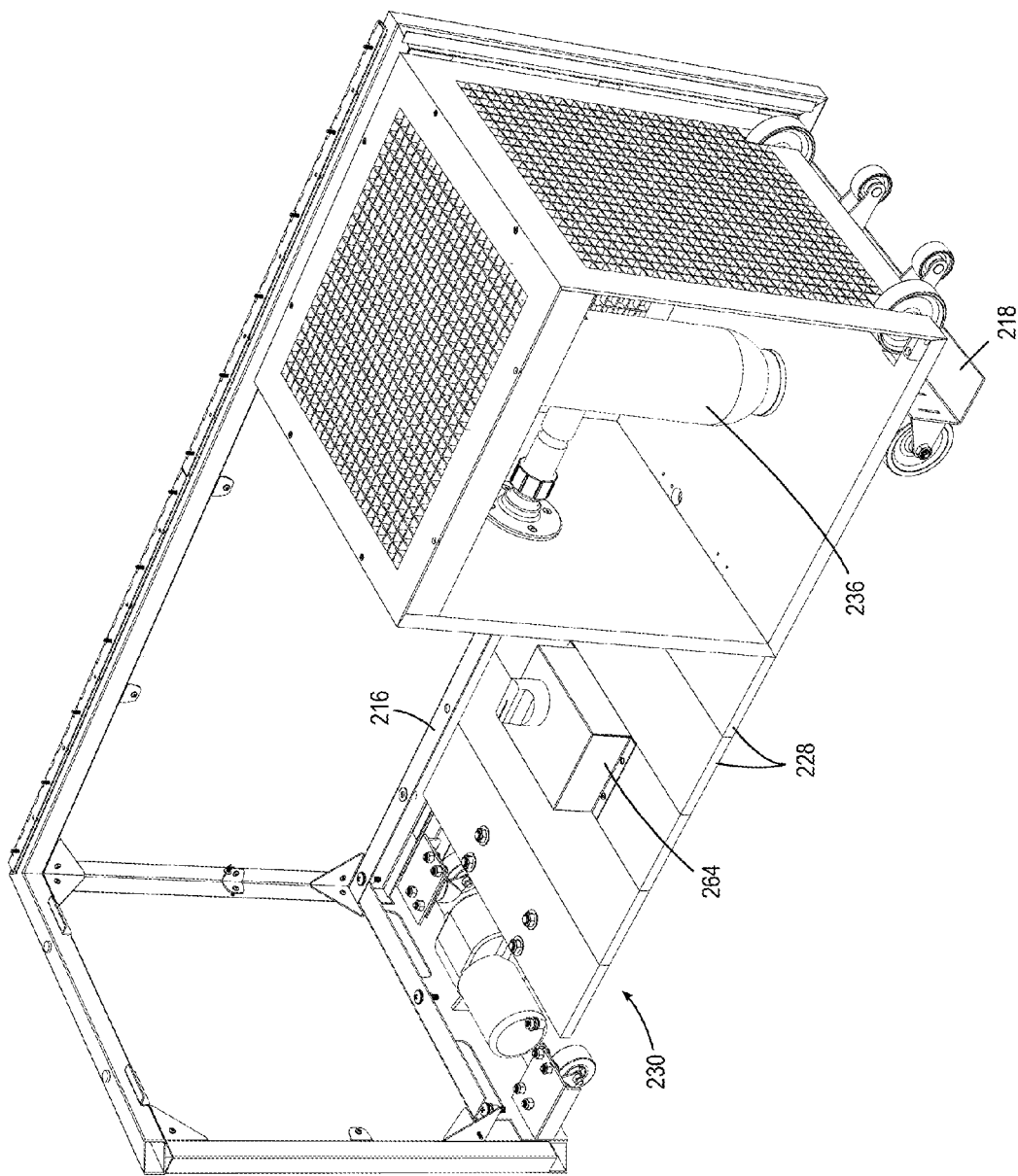
FIG. 11 is a top perspective view of the swim current generator of FIG. 7 with several components removed.
Figure 12:
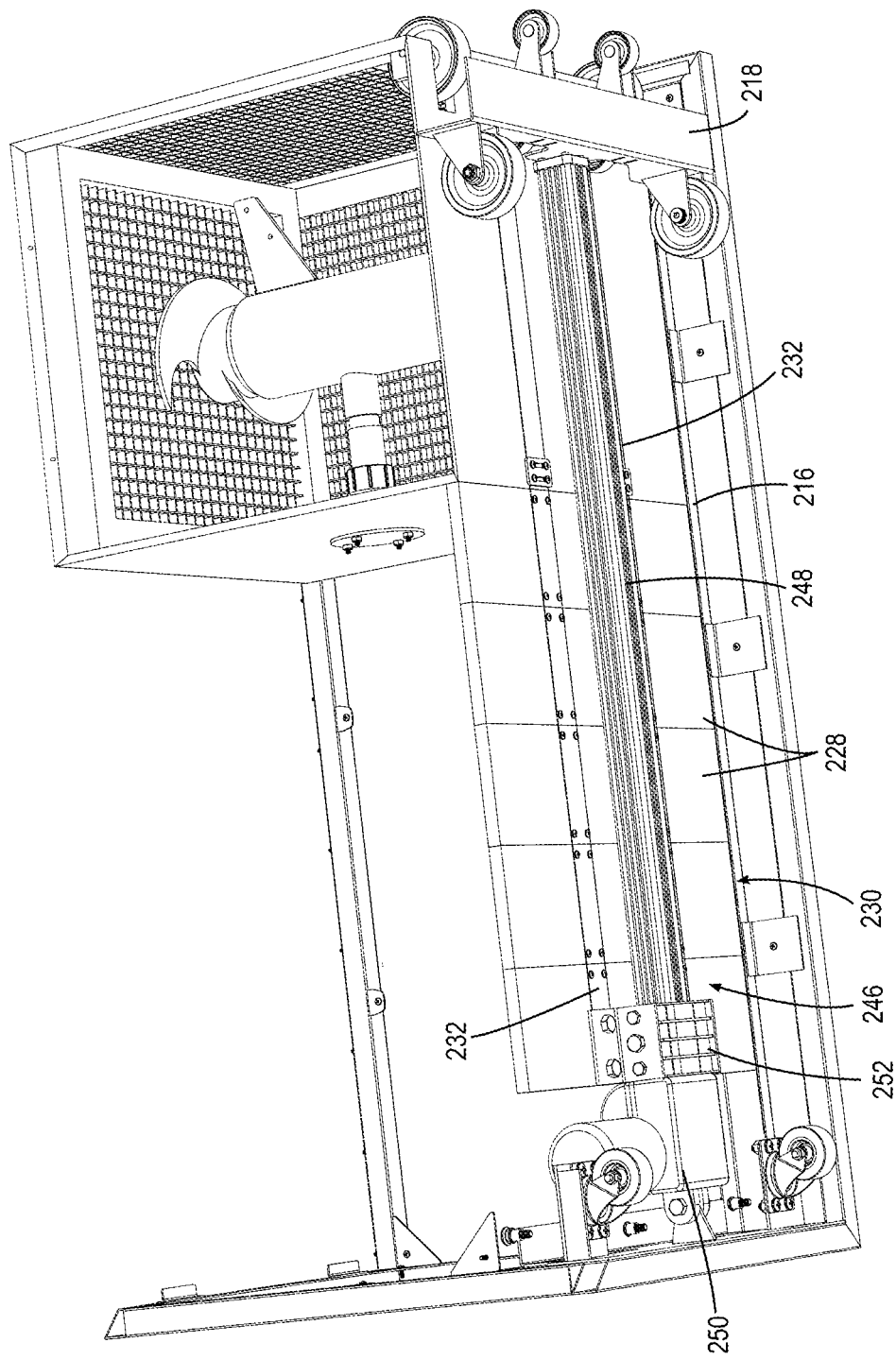
FIG. 12 is a bottom perspective view of the swim current generator of FIG. 7 with several components removed.
Figure 13:
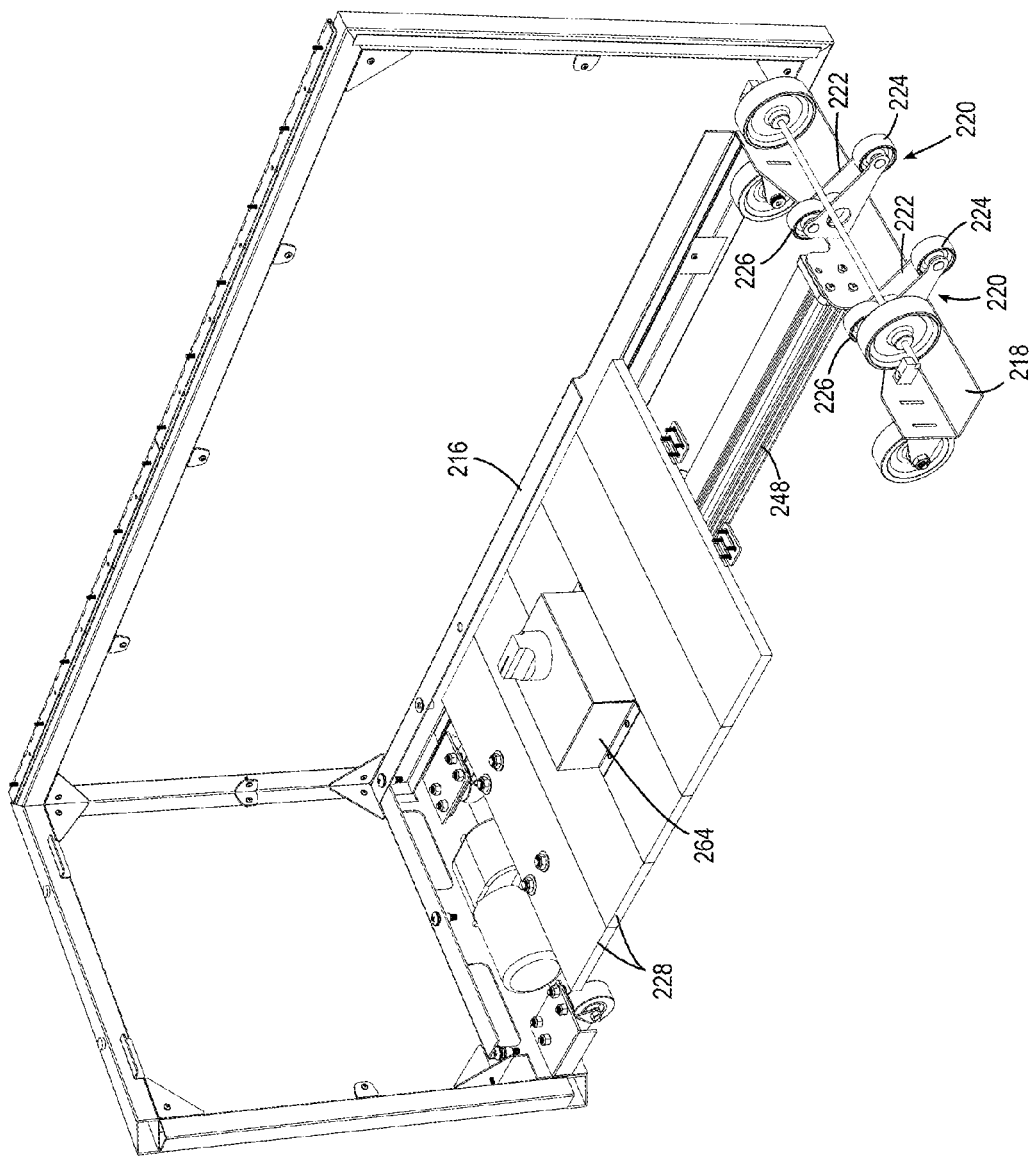
FIG. 13 is a top perspective view of a lift apparatus of the swim current generator of FIG. 7.

The panels 202A-202D are mounted to a frame 208 which is best seen in FIG. 10. The frame 208 is generally in the form of a rectangular box, and includes a pair of spaced-apart rectangular side frames 210 interconnected by several crossmembers 212. The frame 208 may be constructed from any rigid material, such as wood, plastic, composites, or metal. Preferably it is made from a material that is water and moisture resistant. In the illustrated example, the frame 208 is built up from stainless steel members welded together.

Collectively the frame 208 and the attached panels 202A-202D define an enclosure that that mounts, surrounds, and protects the operating components of the swim current generator 200 while presenting a pleasing exterior appearance.

A set of wheels 213 (best seen in FIG. 9) is mounted to the bottom of the frame 208 and allows the swim current generator 200 to be rolled around on a pool deck or other surface. The wheels 213 may include a combination of fixed and castering units, so as to permit steering and maneuvering as required.

The frame 208 carries a lift apparatus 214 as shown in FIGS. 10-13. A pair of fixed, parallel, spaced-apart rails 216 are secured to the frame 208 (one of the rails 216 is removed for clarity in FIGS. 11-13). The rails 216 extend in a longitudinal direction and collectively define a lift frame. Each rail 216 has a generally "C"-shaped cross-section with a web and two laterally-extending flanges. A portion of the flange is cut back on the forward end of each rail 216. The forward ends of the rails 216 join an L-shaped crossmember 218. The crossmember 218 also carries at least one guide element adapted to help transition movement of a belt 230 from horizontal to vertical and vice-versa, for example at least one ramp or at least one roller. In the illustrated example, a pair of spaced-apart guide roller assemblies 220 are provided (see FIG. 13). Each guide roller assembly 220 includes a generally triangular bracket 222 which carries a lower roller 224 and an upper roller 226.

A plurality of slats 228 are carried between the rails 216. Each slat 228 is generally rectangular and extends laterally from one rail 216 to the opposite rail 216. The slats 228 may be constructed of any rigid material such as wood, plastic, composites, or metal. Preferably they are made from a material that is water and moisture resistant, and that also has low friction. For example, they may be made from a polymer such as PVC.

The slats 228 are coupled together in such a way that they collectively form a belt 230 which is capable of transmitting both tension and compression forces, and such that the slats 228 can bend, flex, or pivot along the lateral joints between adjacent slats 228. In other words, the belt 230 is capable of bending in one plane. One or more flexible straps may extend across the plurality of slats. In the illustrated example, the slats 228 are coupled together by a pair of flexible straps 232 (see FIG. 12) running along the bottom surfaces of the slats 228. The straps 232 are attached to each slat 228, for example with the illustrated fasteners, and may be made from any tough, flexible material, such as aramid fibers available under the KEVLAR brand name. Alternatively, the assembly of slats 228 could be fastened together by conventional hinges (not shown) or could incorporate integral hinges. In either case, the straps 232 would not be necessary. The belt 230 is able to slide between a retracted or stowed position (shown in FIG. 7) and an extended or "use" position, shown in FIG. 16.

Figure 14:
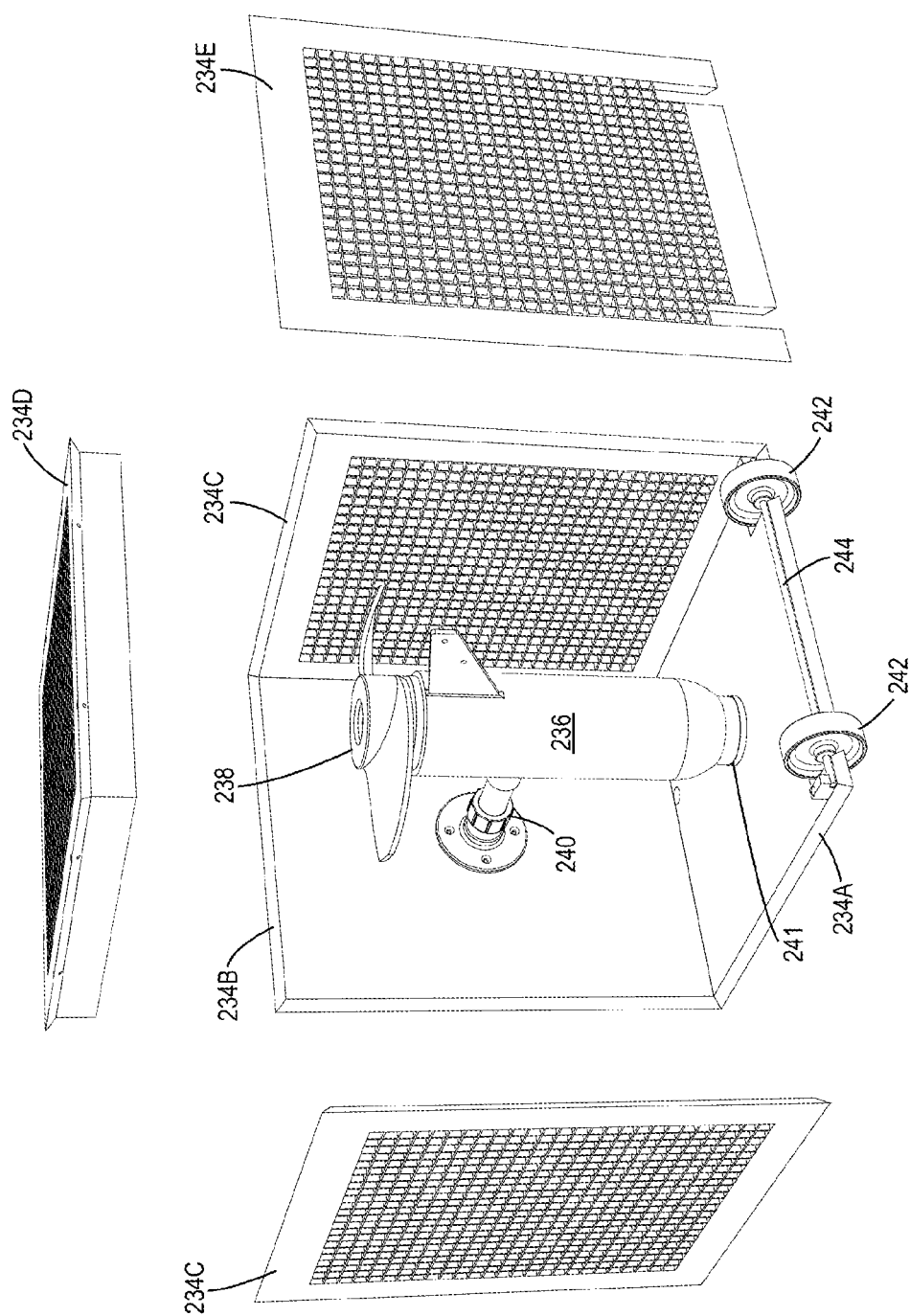
FIG. 14 is an exploded perspective view of a motor shroud of the swim current generator of FIG. 7.

As seen in FIG. 14, the motor shroud 204 is generally in the form of a cube and includes several plates 234A-234E, more specifically particular a bottom plate 234A, a back plate 234B, a pair of opposed side plates 234C, a top plate 234D, and a front plate 234E. As used herein, the direction terms "top", "bottom", etc. refer to the motor shroud 204 in the retracted or stowed position. Such terms are for relative reference purposes only. Some or all of the plates 234A-234E have an open area provided by an array of holes or an open gridwork. In the specific example illustrated, the back plate 234B and the bottom plate 234A are solid, while the remaining plates 234C-234E each have a substantial open area provided by an array of holes or an open gridwork. The plates 234A-234E may be constructed of any rigid material, such as wood, plastic, composites, or metal. Preferably they are made from a material that is water and moisture resistant. For example, they may be made from a polymer such as PVC, and may be assembled to each other by fasteners such as the illustrated screws, or by adhesives or mechanical joints.

A motor 236 is disposed within the motor shroud 204 and carries a propeller 238. In the illustrated example, the motor 236 and propeller 238 are identical to those used in commercially-available boat trolling motors. The motor 236 is mounted to the back plate 234B with a mount 240. A cup-shaped thrust plate 241 may be mounted between the motor 236 and the bottom wall 234A to support the motor 236 and transfer thrust loads from the motor 236 to the bottom wall 234A. The motor 236 is oriented such that it will discharge water through the top plate 234D in operation.

The motor shroud 204 is sized and shaped so as to be able to rest on, and slide relative to, the forward portions of the rails 216. The bottom plate 234A is coupled to the belt 230 by the straps 232, and mechanically functions as one of the slats 228. Collectively, the motor shroud 204 with the motor 236 and propeller 238 and the lift apparatus define a water propulsion apparatus.

Optionally, a pair of rollers 242 are mounted on an axle 244 which runs laterally along the bottom plate 234A at the intersection of the bottom plate 234A and the front plate 234E.

An actuator 246 (see FIG. 12) is disposed under the belt 230 and is mounted in a stationary position relative to the frame 208. In the illustrated example the actuator 246 is a commercially-available linear type including a center rail 248, an electric drive unit 250, and a carriage 252 which is moveable along the length of the center rail 248 in response to operation of the drive unit 250. The carriage 252 is coupled to the slats 228 such that movement of the carriage 252 drives the belt 230 along the rails 216.

A suitable electrical power source for the motor 236 and the actuator 246 is provided. Any electrical power source that will operate the motor 236 and the actuator 246 may be used. For example, depending on the type of motor 236 and actuator 246, conventional AC line current may be routed through the enclosure directly to those components. As another example, a commercially-available power supply that accepts AC line current and outputs low-voltage DC current for the motor 236 and actuator 246 may be placed either inside the enclosure or at a remote location and connected to the enclosure through low-voltage cabling. In the illustrated example a pair of 12 Volt deep-cycle marine batteries 254 are mounted in a rear compartment 256 of the enclosure (see FIG. 10) and wired in series to provide 24 Volt power. A hinged lid 258 provides access for maintenance or repair. A commercially-available charger 260 is mounted in the rear compartment 256. The charger 260 is configured to be connected to a conventional power source, such as conventional AC line current, and providing charging current to the batteries 254. An AC connector 261 for the charger 260 is accessible through the side panel 202C (see FIGS. 8 and 10).

An extension control 262 is provided to operate the actuator 246. In the illustrated example, the extension control 262 is a hand-held unit contained in a center compartment 263 disposed just under the top panel 202D. Suitable electrical connections are made in a known matter between the batteries 254, the extension control 262, and the actuator 246 so that in response to a user input to the extension control 262, power from the batteries 254 will be supplied to the actuator 246 to drive the belt 230 inward or outward depending on the specific input. While a wired unit is shown, the extension control 262 could also be operated using known wireless remote control apparatus and methods.

A motor control switch 264 is mounted on one of the slats 228 and is exposed when the belt 230 is in the extended position. Suitable electrical connections are made in a known matter between the batteries 254, the motor control switch 264, and the motor 236 so that, depending on the setting of the motor control switch 264, the motor 236 will either be stopped or operating at a desired speed. The motor control switch 264 may incorporate (or be connected to) a conventional motor speed control, such as a transistorized motor controller. While a wired unit is shown, the motor control switch 264 could also be operated using known wireless remote control apparatus and methods.

In operation, a user would first roll the swim current generator 200 to a suitable location at the edge of a swimming pool. The top panel or lid 202D is opened and the extension control 262 is then operated, causing the belt 230 to move to the extended position, forcing the motor shroud 204 axially out of the end of the enclosure and allowing the motor shroud 204 to roll over the guide roller assemblies 220 and drop vertically downwards into the water. As the motor shroud 204 drops downward, the slats 228 bend or pivot to permit this motion. If used, the optional rollers 242 help the motor shroud 204 roll down the vertical pool wall.

Figure 15:
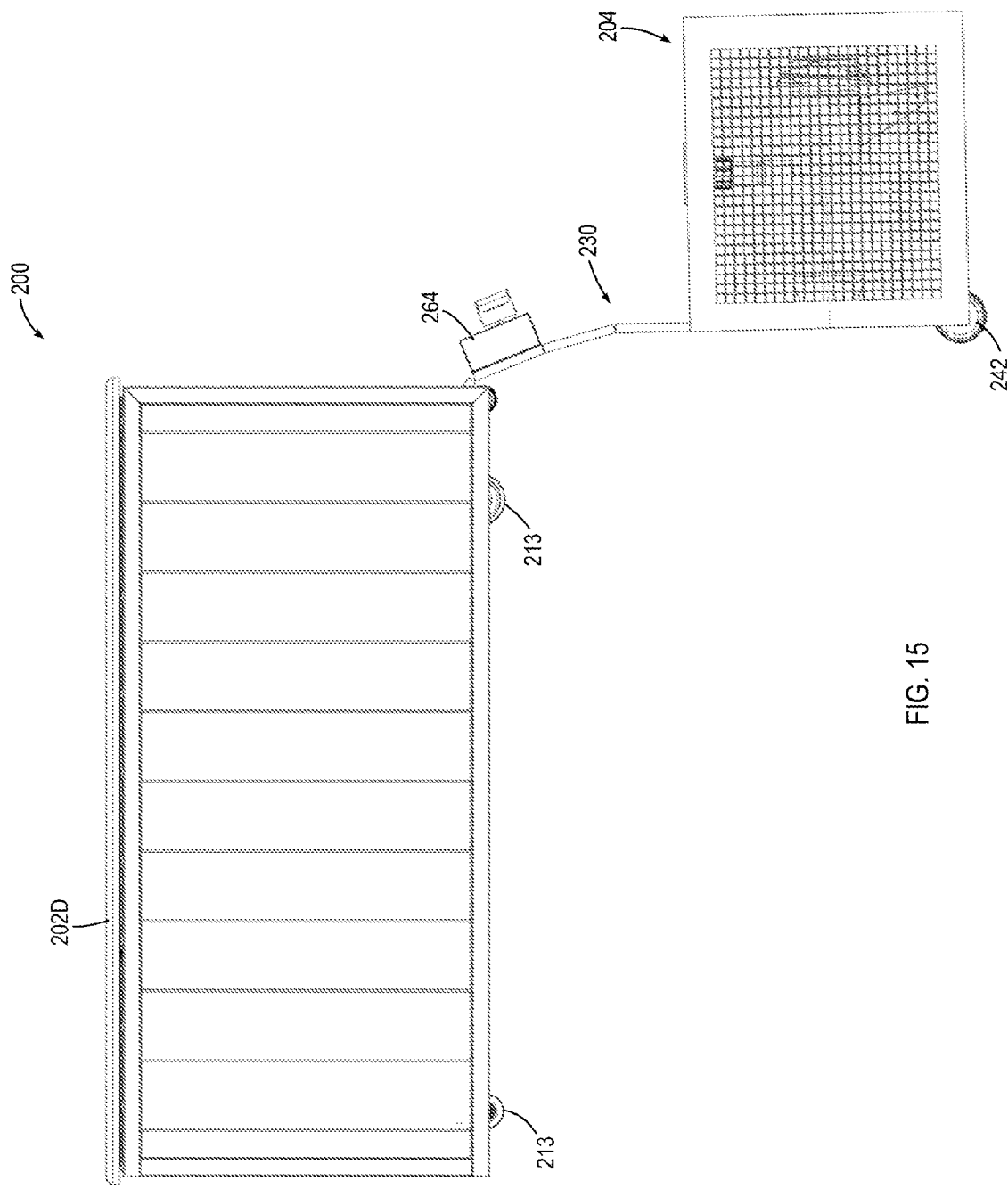
FIG. 15 is a side view of the swim current generator of FIG. 7 in an extended or "in use" position.
Figure 16:
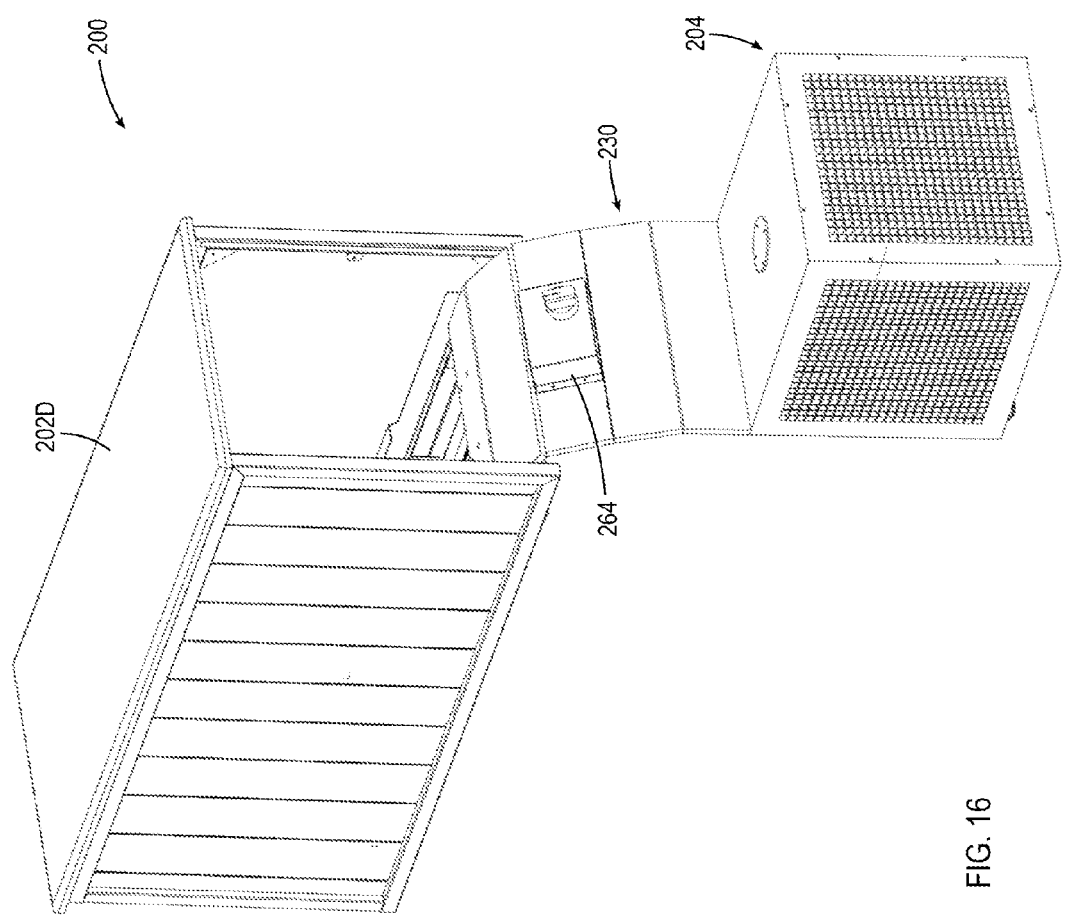
FIG. 16 is a perspective view of the swim current generator of FIG. 7 in an extended or "in use" position.
Figure 17:
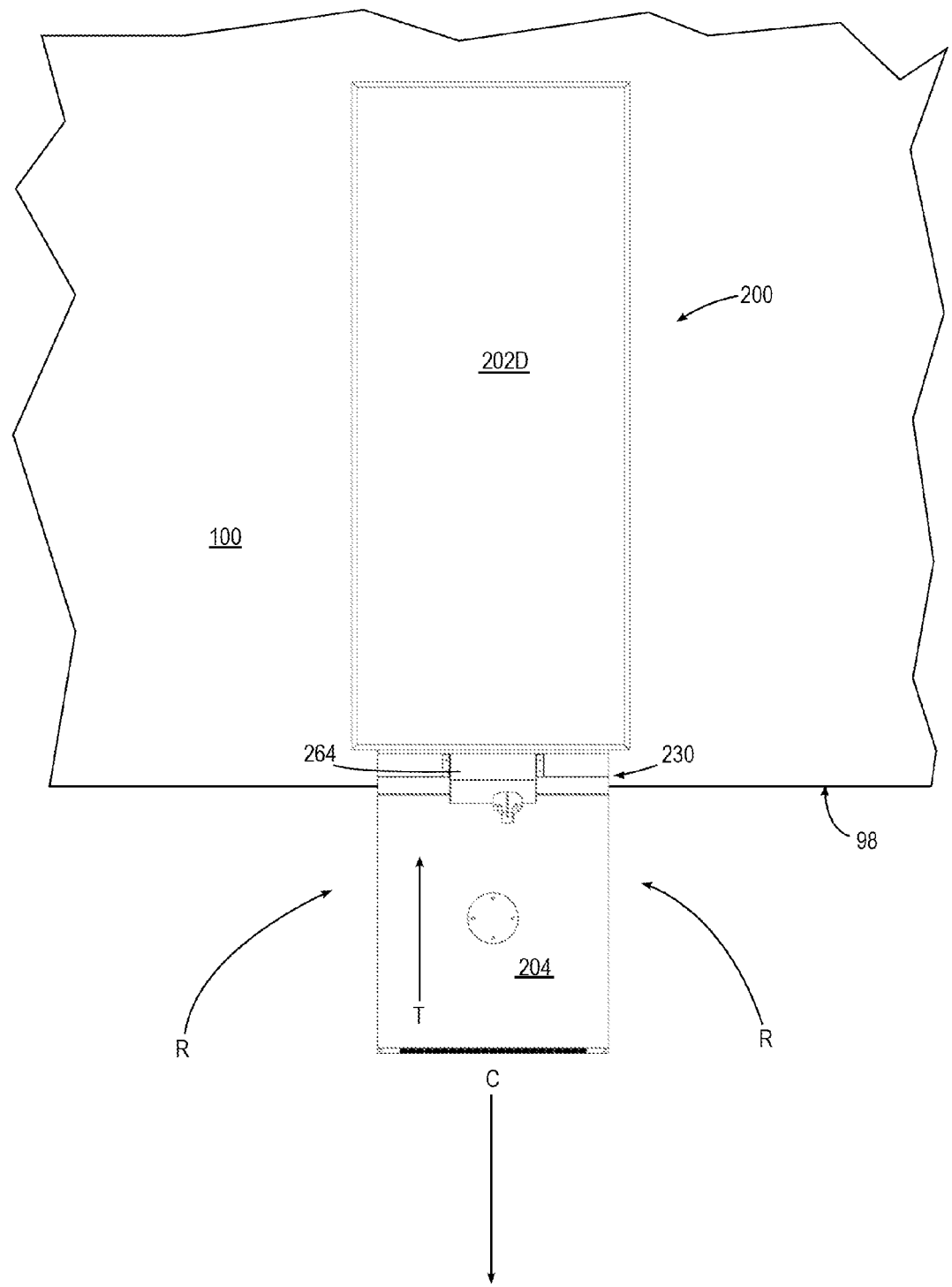
FIG. 17 is a top view of the swim current generator of FIG. 7 in an extended or "in use" position adjacent a swimming pool.

Once fully extended, as seen in FIGS. 15-17, the motor control switch 264 can be accessed to turn the motor 236 on. As seen in FIG. 17, the motor 236 and propeller 238 generate a swim current "C", flowing outward from the pool wall 98. The direction of the inflow or return flow "R" is shown entering the sides of the motor shroud 204 (and also enters through the front panel 234E). The thrust "T" generated by the propeller 238 causes the motor shroud 204 to move backwards against the pool wall 98. Because the thrust force is reacted against the pool wall 98, there is no significant thrust load on the belt 230 or the frame 208. As a result, there is no need for any portion of the swim current generator 200 to be mounted or anchored into position on the pool deck 100.

Because of the large inlet area of the motor shroud 204, approximately 0.39 m$^2$ (600 in.$^2$) in the illustrated example, the local flow velocity and pressure drop is quite low. This means there is little to no risk of a swimmer's hair being drawn into the motor shroud 204.

When the user is finished, the motor 236 can be shut off using the motor control switch 264. The extension control 262 is then operated, causing the belt 230 to move to the retracted position, pulling the motor shroud 204 vertically out of the water. If used, the optional rollers 242 help the motor shroud 204 roll up the vertical pool wall. Once the motor shroud 204 reaches its maximum vertical height, the action of the belt 230 pulling longitudinally causes it to pivot back into position within the enclosure. The roller guide assemblies 220 and the rollers 242 enable the motor shroud 204 to pivot back into position. Once stowed (retracted), the lid 202D can be closed and the swim current generator 200 can be rolled away on the wheels 213 for storage and/or charging as desired.

The swim current generator described herein has several advantages over the prior art. It is portable and simple to use, and is safe because of the low-voltage power source. When stored, it maintains a decorative aesthetic appearance, not unlike that of a decorative poolside or patio storage container. Furthermore, the present invention can be utilized in an existing, limited swim environment in order to simulate unlimited distance swimming by producing an adjustable swim current.

The foregoing has described a portable swim current generator. While specific embodiments of the present invention have been described, it will be apparent to those skilled in the art that various modifications thereto can be made without departing from the spirit and scope of the invention.

What is claimed is:

1. A water propulsion apparatus for a swim current generator, comprising:
   a lift frame;
   a belt having first and second ends, the belt being configured to transmit both tension and compression forces and being capable of bending in one plane, wherein the belt is slidably mounted in the lift frame so as to be moveable between extended and retracted positions;
   a motor shroud coupled to one end of the belt, the motor shroud enclosing a motor coupled to a propeller, the motor shroud having openings therein to permit the intake and discharge of water by the propeller; and
   an actuator coupled to the lift frame and the belt, wherein the actuator is configured to move the belt between the extended and retracted positions.

2. The apparatus of claim 1 wherein the motor shroud is configured to bear against a wall of a swimming pool.

3. The apparatus of claim 1 wherein the belt comprises a plurality of slats.

4. The apparatus of claim 3 wherein the belt comprises one or more flexible straps extending across the plurality of slats.

5. The apparatus of claim 1 wherein the lift frame carries at least one guide roller assembly, each guide roller assembly including a bracket which carries at least one roller.

6. The apparatus of claim 1 wherein the motor shroud includes at least one roller.

7. A swim current generator apparatus, comprising:
   an enclosure; and
   a motor shroud, the motor shroud enclosing a motor coupled to a propeller, the motor shroud having openings therein to permit the intake and discharge of water by the propeller, wherein the motor shroud is moveable between a retracted position within the enclosure and an extended position outside the enclosure, wherein the motor shroud includes a panel which is configured so as to form a portion of the enclosure when in the retracted position.

8. The apparatus of claim 7 wherein the motor shroud is configured to bear against a wall of a swimming pool.

9. The apparatus of claim 7 wherein the enclosure is mounted on one or more wheels.

10. A swim current generator apparatus, comprising:
    an enclosure; and
    a motor shroud, the motor shroud enclosing a motor coupled to a propeller, the motor shroud having openings therein to permit the intake and discharge of water by the propeller, wherein the motor shroud is moveable between a retracted position within the enclosure and an extended position outside the enclosure;
    wherein a lift apparatus is coupled to the motor shroud and the enclosure, the lift apparatus operable to move the motor shroud between the retracted position the extended position, wherein the lift apparatus includes:
    a carriage mounted on rollers; and
    a support shaft carried by the carriage, the support shaft being pivotable between horizontal and vertical positions, where the motor is coupled to the support shaft.

11. A swim current generator apparatus, comprising:
    an enclosure;
    a lift frame disposed inside the enclosure;
    a belt having first and second ends, the belt being configured to transmit both tension and compression forces and being capable of bending in one plane, wherein the belt is slidably mounted in the frame so as to be moveable between extended and retracted positions;
    a motor shroud coupled to the one end of the belt, the motor shroud enclosing a motor coupled to a propeller, the motor shroud configured to bear against a wall of a swimming pool and having openings therein to permit the intake and discharge of water by the propeller; and
    an actuator coupled to the frame and the belt, wherein the actuator is configured to move the belt between the extended and retracted positions.

12. The apparatus of claim 11 wherein the belt comprises a plurality of slats.

13. The apparatus of claim 12 wherein the belt comprises one or more flexible straps extending across the plurality of slats.

14. The apparatus of claim 11 wherein the frame carries at least one guide roller assembly, each guide roller assembly including a bracket which carries at least one roller.

15. The apparatus of claim 11 wherein the motor shroud includes at least one roller.

16. The apparatus of claim 11 wherein the motor shroud is generally rectangular and includes opposed front and back plates, opposed side plates, and opposed top and bottom plates.

17. The apparatus of claim 16 wherein some of the plates are formed into an open gridwork.

18. The apparatus of claim 11 further comprising an electric power source disposed in the enclosure.

19. The apparatus of claim 18 further comprising a motor control switch operably connected to the electrical power source and motor, wherein the motor control switch is mounted to the belt such that it resides in the enclosure in the retracted position and is exposed outside the enclosure in the extended position.

* * * * *